United States Patent [19]

Aoki

[11] Patent Number: 5,018,682
[45] Date of Patent: May 28, 1991

[54] FISHING REEL HAVING A SPOOL SHAFT SUPPORTED AT BOTH ENDS THEREOF

[75] Inventor: Atsuhito Aoki, Hiroshima, Japan
[73] Assignee: Ryobi Ltd., Hiroshima, Japan
[21] Appl. No.: 433,196
[22] Filed: Nov. 8, 1989

Related U.S. Application Data

[62] Division of Ser. No. 274,563, Nov. 23, 1988, Pat. No. 4,901,944.

[30] Foreign Application Priority Data

Nov. 24, 1987 [JP] Japan ............... 62-179516[U]
Nov. 26, 1987 [JP] Japan ............... 62-180870[U]

[51] Int. Cl.⁵ .......................................... A01K 89/015
[52] U.S. Cl. .......................................... 242/268
[58] Field of Search ............... 242/259, 260, 261, 262, 242/268, 264

[56] References Cited

U.S. PATENT DOCUMENTS

| | | | |
|---|---|---|---|
| 1,495,676 | 5/1924 | Coxe | 242/268 |
| 1,554,786 | 9/1925 | Case | 242/268 |
| 1,697,851 | 1/1929 | Case | 242/268 |
| 2,263,836 | 11/1941 | Baly et al. | 242/268 |
| 4,742,974 | 5/1988 | Furomoto | |
| 4,763,856 | 8/1988 | Kaneko | 242/268 |
| 4,901,944 | 2/1990 | Aoki | 242/260 |

FOREIGN PATENT DOCUMENTS

50-23584 7/1975 Japan.
50-204476 12/1987 Japan.

Primary Examiner—Katherine Matecki
Attorney, Agent, or Firm—Finnegan, Henderson, Farabow, Garrett and Dunner

[57] ABSTRACT

A fishing reel includes a drag adjustment mechanism comprising a plurality of drag washers in the form of friction plates mounted on a master gear shaft. The drag washers are urged into contact with a master gear that is selectively connectable to a spool shaft so that the master gear can rotate together with the master gear shaft and can slip relative thereto. A drag adjustment member is mounted on the master gear shaft and is operable to move the master gear shaft to urge the drag washers toward the master gear by pushing a ball bearing and a drag spring washer to thereby cause a drag adjustment. A drag preset member is mounted on the master gear shaft and is moveable along the master gear shaft to urge the drag washers toward the master gear by pushing the drag adjustment member, the ball bearing and the drag spring washer to thereby cause a drag adjustment.

5 Claims, 5 Drawing Sheets

FISHING REEL HAVING A SPOOL SHAFT SUPPORTED AT BOTH ENDS THEREOF

This is a division of application Ser. No. 274,563, filed Nov. 23, 1988, and issued as U.S. Pat. No. 4,901,944 on Feb. 20, 1990.

FIELD OF THE INVENTION

The present invention relates to a fishing reel having an improved drag mechanism including elements movable in the radial and axial directions.

BACKGROUND OF THE INVENTION

Japanese Laid Open Utility Model Application (Kokai) No. 23584/1975 discloses a conventional fishing reel of the radially and axially moveable type in which a drag adjustment device is mounted on a rotatable shaft to which a handle is connected. In this conventional spinning reel, friction plates mounted on the rotatable shaft are urged by a drag adjustment cam disc. The drag adjustment cam disc is movable along the axis of the rotatable shaft by a resilient washer. A operating cam disc is provided for slidingly moving the drag adjustment cam disc along the rotatable shaft and is rotatably mounted around a bearing member that is disposed inwardly of the handle and fixedly secured to a side plate of the reel body. The operating cam disc has an operating lever.

The conventional drag adjustment device is rotatably mounted around the bearing member that is fixedly secured to a side plate of a reel body. Consequently, a reaction force persists which urges the friction plates to act on the side plate thereby affecting the overall strength of the side plate. As a result, the strength and rigidity of the side plate must be increased. The problem, however, is that as the strength increases so does the overall weight of the reel.

Further, in the conventional drag adjustment device, a bearing is interposed between the rotatable shaft and the bearing member fixedly secured to the side plate. The bearing is utilized to rotate the shaft and does not perform any function when the operating lever is rotated. In addition, guide threads formed on the operating cam disc engage threads formed in the outer periphery of the bearing member. The reaction force of the drag force is absorbed by these engaged portion and as a result, a large force is required to overcome the drag force to rotate the operating lever. The difficulty is that a large force requirement interferes with the ability to achieve a smooth drag adjustment for finely tuning the drag.

SUMMARY OF THE INVENTION

An object of the present invention is to overcome the problems and disadvantages of the prior art.

Another object of the present invention is a fishing reel including a drag mechanism having a smooth drag adjustment controllable by the operating lever.

Another object of the present invention is to construct a drag mechanism that handles the forces applied thereto such that fine adjustments may be made in the drag when desired.

Another object of the present invention is a fishing reel structured such that reaction forces applied will not entirely be distributed to the side cover member.

Another object of the present invention is a fishing reel constructed such that a side plate lighter in weight may be effectively employed.

A further object of the present invention is a spinning fishing reel that is formed from few parts and thus may be economically manufactured.

To achieve the objects and in accordance with the purpose of the present invention, as embodied and broadly described herein, the present invention comprises a body having a side wall, to which a spool shaft is mounted for rotation about a first axis. A spool is fixedly mounted on the spool shaft for rotation to wind a fishing line. A master gear shaft is mounted, at one end on the side wall to be rotatable about a second axis and a handle is secured to the other end of the master gear shaft to rotate the master gear about the second axis. A master gear is rotatably mounted on the master gear shaft and disposed adjacent to the side wall. A pinion is engageably and disegageably and the drag spring washer are mounted on the spool shaft and meshingly engages the master gear. A clutch means is provided for coupling the pinion to the spool shaft so as to rotate the pinion together with the spool gear. A plurality of drag washers formed of friction plates are mounted on the master gear shaft and are urged into contact with the master gear so that the master gear can rotate together with the master gear shaft and can slip relative thereto. A drag spring washer is mounted on the master gear shaft and a first ball bearing is mounted on the master gear shaft for movement therealong. An axially urging means is provided for urging the drag washers toward the master gear by pushing the first ball bearing, the drag washers and the axially urging means. A drag adjustment lever is rotatably mounted on the master gear shaft for operating the axially urging means to urge the drag washers toward the master gear. The drag adjustment lever is movable along the master cylinder. A second ball bearing is mounted on the master gear shaft for movement therealong. A drag preset member is mounted on the master gear adjacent to the handle, the second ball bearing being interposed between drag present member and the drag adjustment lever. The drag preset member is operated along the master gear shaft to urge the drag washers toward the master gear by pushing the second ball bearing, the drag adjusting lever, the axially urging means, the first ball bearing, and the drag spring washer.

The second aspect of the present invention, further comprises a cover member secured to the side wall. A drag adjustment member having a generally hollow cylindrical shape is mounted around the master gear and engaged with the cover member. The drag adjustment member is rotatable with respect to the cover member to move along the master gear shaft to urge the drag washers toward the master gear by moving the first ball bearing and the drag spring washer. The first ball bearing and the drag spring washer are contained within the drag adjustment member, and the drag spring washer and the first ball bearing are disposed between the drag washers and a drag preset member. A drag adjustment lever is fixedly connected to the drag adjustment member to rotate it about the master cylinder with respect to the cover member. The drag present member is mounted on the master gear and engages with the drag adjustment member. The drag preset member is rotatable with respect to the drag adjustment member to move along the master gear to urge the drag washers toward the master gear by moving the first ball bearing and the drag spring washer.

BRIEF DESCRIPTION OF THE DRAWINGS

The accompanying drawings, which are incorporated in and constitute a part of this specification, illustrate several embodiments of the present invention and together with the description, serve to explain the principles of the present invention.

DETAILED DESCRIPTION OF THE PREFERRED EMBODIMENTS

Figure 1:
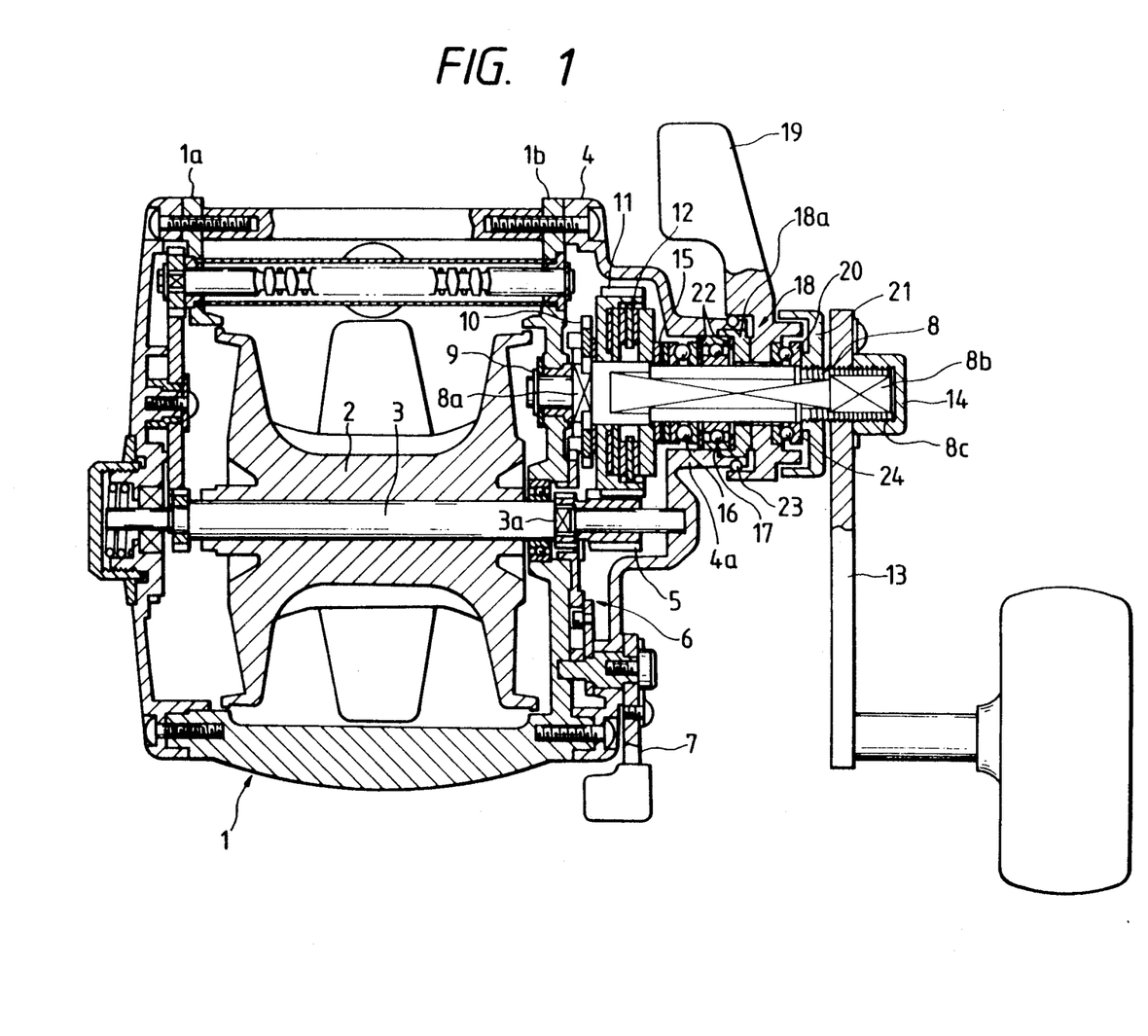
FIG. 1 is a cross-sectional view of the fishing reel of the present invention.
Figure 2:
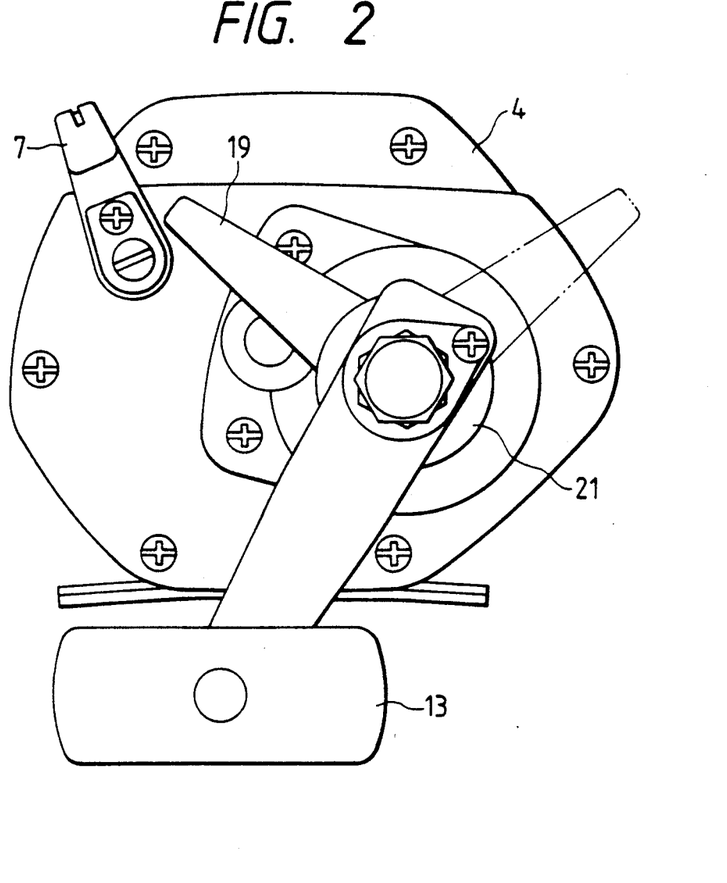
FIG. 2 is a side elevational view from the right side of FIG. 1 of the fishing reel of the present invention.

As shown in FIG. 1, a spool shaft 3 having first and second ends is mounted on right and left hand side plates or walls 1a and 1b of a reel body 1. The first end portion of the spool shaft 3 includes a non-circular portion 3a. The spool shaft 3 is rotatable about its own axis. Spool 2 is fixedly mounted on the spool shaft 3 for rotation with spool shaft 3. The first end of the spool shaft 3 extends outwardly through the side plate 1b, which is covered by a side cover member 4. The side cover member 4 is secured to the side plate 1b. A pinion 5 is mounted on the first end portion of the spool shaft 3 for slidable movement along the spool shaft 3.

A clutch 6 having a clutch lever 7 is provided. The clutch lever 7 of a clutch 6 functions as a switching means to slide the pinion 5 along the spool shaft 3 into and out of engagement with the non-circular portion 3a of the spool shaft 3. When the pinion 5 is in engagement with the non-circular portion 3a, the pinion 5 rotates along with the spool shaft 3. When the pinion 5 is out of engagement with the non-circular portion 3a, the pinion 5 is rotatable relative to the spool shaft 3.

A master gear shaft 8 having a non-circular portion 8a provided at its inner end is rotatably supported by the side plate 1b. A retainer ring 9 is mounted on the inner end of the master gear shaft 8 to prevent axial movement of the master gear shaft 8. A ratchet 10 is mounted on the non-circular portion 8a of the master gear shaft 8. A master or drive gear 11 is mounted on the master gear shaft 8 and meshes with the pinion 5. The master gear 11 has a non-circular portion. A plurality of drag washers 12 in the form of friction plates are received by the master gear 11 and mounted on the non-circular portion of the master gear shaft 11 for rotation therewith. The presence of the plurality of drag washers 12 allows the master gear 11 to rotate together with and slip relative to the master gear shaft 8.

The side cover 4 includes a hollow cylindrical portion 4a. The outer end portion of the master gear shaft 8 extends outwardly through the hollow cylindrical portion 4a. The outer end portion of the master gear shaft 8 has a non-circular section 8b on which a handle 13 is fitted in a non-rotatable manner. The handle 13 is secured to the outer end portion of the master gear shaft 8 by a clamp screw 14 located on an externally threaded section 8c that is formed on the outer end portion of the master gear shaft 8.

The drag washers 12 are urged by a drag preset screw or drag member 21 by an urging means that comprises the following elements: a drag spring washer 15; ball bearings 16 and 17; an axially urging means 18; a drag adjustment lever 19; and a ball bearing 20. The elements of the urging means are positioned in the above-recited order from the drag washers 12 and are movable along the master gear shaft 8. The drag preset member 21 is threaded on the externally threaded section 8c of the master gear shaft 8 so as to be movable therealong in opposite directions.

As shown in FIG. 1, two ball bearings 16 and 17 are disposed inwardly of the axially urging means 18. If the inner ball bearing 16 is a thrust bearing then it is preferred that the outer ball bearing 17 comprise a radial bearing. In contrast, if the inner ball bearing 16 is a radial bearing, it is preferred that the outer bearing 17 comprise a thrust bearing. In the former case, washers 22 are interposed between the two ball bearings 16 and 17 and between the ball bearing 17 and the axially urging means 18, respectively. In the latter case, a washer, having an inner diameter corresponding to the diameter of the master gear shaft 8 as well as an outer diameter corresponding to the outer diameter of the ball bearing 16, is interposed between the drag spring washer 15 and the ball bearing 16, and a washer similar to the washer 22 is interposed between the thrust bearing 17 and the radial bearing 16. A thrust ball bearing 20 is also mounted on the master gear shaft 8 on the outer side of the drag adjustment lever 19 so that both axial and radial loads can be withstood. The bearing 20 is movable along the master gear shaft 8.

Figure 4:
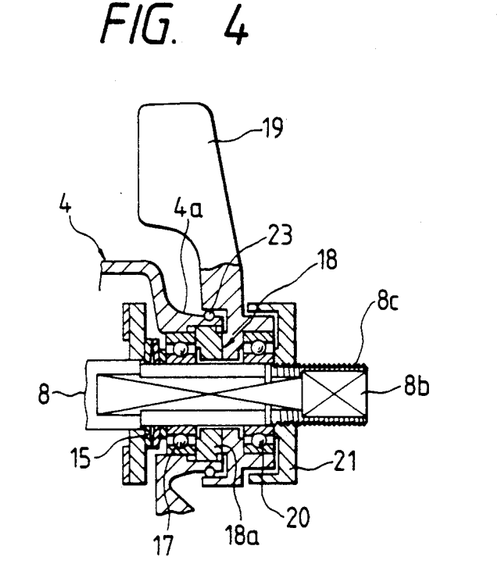
FIGS. 4 and 5 are fragmentary views of two types of axially urging means of the fishing feel of the present invention.
Figure 5:
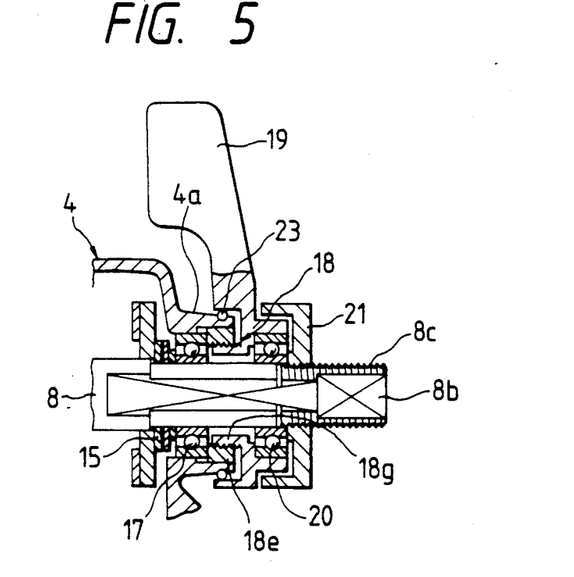

As shown in FIGS. 4 and 5, a pair of radial ball bearings 17 and 20 may be disposed on the opposite sides of the axially urging means 18, respectively, so as to bear both axial and radial loads, in which case the washers 22 mentioned above are not always necessary.

Preferably, an O-ring 23 is interposed between the cylindrical portion 4a of the side cover member 4 and the drag adjustment lever 19 to enhance the waterproofness and to prevent the loosening of the drag adjustment lever 19. Further, to prevent the loosening of the drag preset screw 21, a spring washer 24 is interposed between the drag preset screw 21 and the handle 13.

The axially urging means 18 varies the urging force under which the drag washers 12 are pushed against the master gear 11, thus acting as a drag adjustment. The axially urging means 18 can be either a cam type, as shown in FIGS. 1 and 4, or a screw type as shown in FIG. 5.

Figure 3:
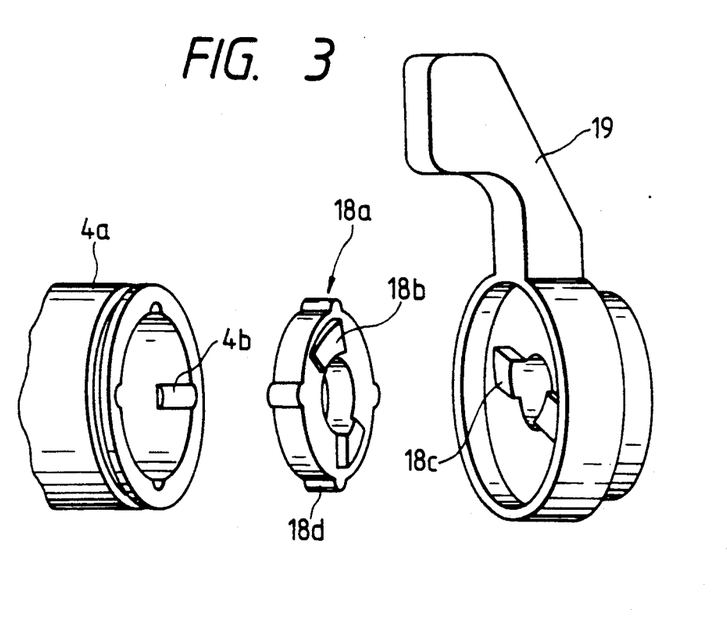
FIG. 3 is an exploded view of the cam-type axially urging means of the fishing reel of the present invention.

More specifically, as shown in FIG. 3, the axially urging means 18 of the cam type comprises a drag adjustment cam member or disc 18a having a wedge-shaped cam portion 18b formed on one side face of the axially urging means 18. A cam portion 18c is formed on a circular base of the drag adjustment lever 19, which is fitted on the master gear shaft 8. The cam portion 18c is held in contact with the surface of the wedge-shaped cam portion 18b which is inclined with respect to a plane perpendicular to a second axis, i.e., the axis of the master gear shaft 8. The drag adjustment cam member 18a has a plurality of ridges 18d extending in the direction of the master gear shaft 8 and formed on the outer periphery of the master gear shaft 8 in circumferentially spaced relation to one another. The cylindrical portion 4a of the side cover member 4 contains a plurality of grooves 4b also extending in the direction of the master gear shaft 8 and formed in its inner peripheral surface in circumferentially spaced relation to one another. The drag adjustment cam member 18a is inserted in the cylindrical portion 4a of the side cover member 4, with individual ridges 18d fitting in individual grooves 4b, respectively, for sliding movement therealong. This construction allows axial movement of the cam member 18a but prevents the rotation of the cam member 18a relative to the cylindrical portion 4a. With this arrangement, upon rotation or angular movement of the drag adjustment lever 19, the drag adjustment cam member 18 is moved along the master gear shaft 8 by cam portions 18c and 18b to effect the drag adjustment.

Figure 6:
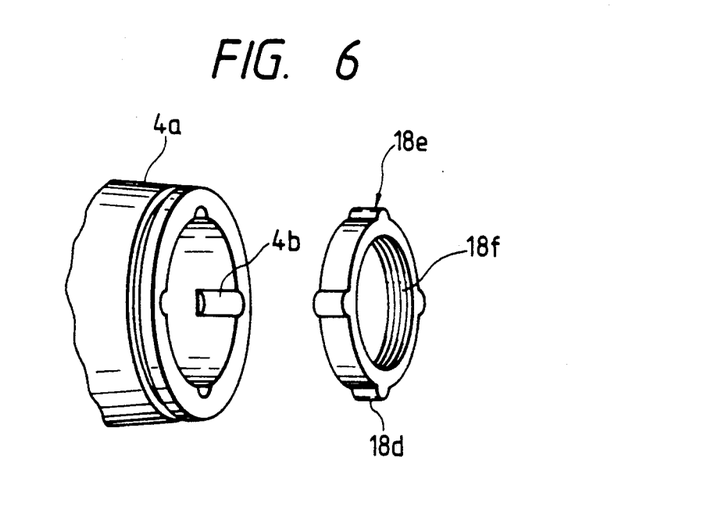
FIG. 6 is an exploded view of the screw-type axially urging means of the fishing reel of the present invention.

FIG. 6 shows a screw-type, axially urging means 18 also shown in FIG. 5. A ring-shaped, drag adjustment screw 18e has an internally threaded bore 18f. Further, a plurality of axially extended ridges 18d are formed on the inner peripheral surface of the axially urging means 18 and are circumferentially spaced from one another. The drag adjustment screw 18e is received in the cylindrical portion 4a of the side cover member 4 having a plurality of grooves 4b. The ridges 18d are fitted in grooves 4b for sliding movement therealong to allow axial movement of the drag adjustment screw 18e but to prevent the rotation of the drag adjustment screw 18e relative to the cylindrical portion 4a. Additionally, an externally threaded cylindrical portion 18g of the drag adjustment lever 19 is threaded into the internally threaded bore 18f of the drag adjustment screw 18e. Upon rotation or angular movement of the drag adjustment lever 19, the drag adjustment screw 18e moves along the master gear shaft 8. This is caused by the threaded engagement of the cylindrical portion 18g of the drag adjustment lever 19 with the bore 18f of the drag adjustment screw 18e and effects drag adjustment.

With the constructions shown in FIGS. 1 to 6, drag adjustment is simple because the drag adjustment lever 19 as well as the drag preset screw 21 can be rotated or angularly moved by the same hand that is used to manipulate the handle 13. In addition, since the reaction force will not be applied to the side cover member 4, etc., the strength and rigidity of the side cover member 4 can be lowered and the overall weight of the spinning fishing reel can be reduced. Moreover, the presence of the thrust ball bearing 20 between the drag adjustment lever 19 and the drag preset screw 21, allows the drag adjustment lever 19 to be rotated smoothly or to be angularly moved upon application of a lesser force, so that drag adjustment is carried out smoothly with fine adjustment.

Further, the drag adjustment mechanism of the present invention is constructed from a fewer number of component parts than is typical of the prior art reels. The drag adjustment mechanism can be assembled merely by passing the master gear 8 through the component parts. No special mounting means need be attached to the side cover member 4, etc. Therefore, the fishing reels according to the present invention can be assembled easily and be manufactured at low costs.

Figure 7:
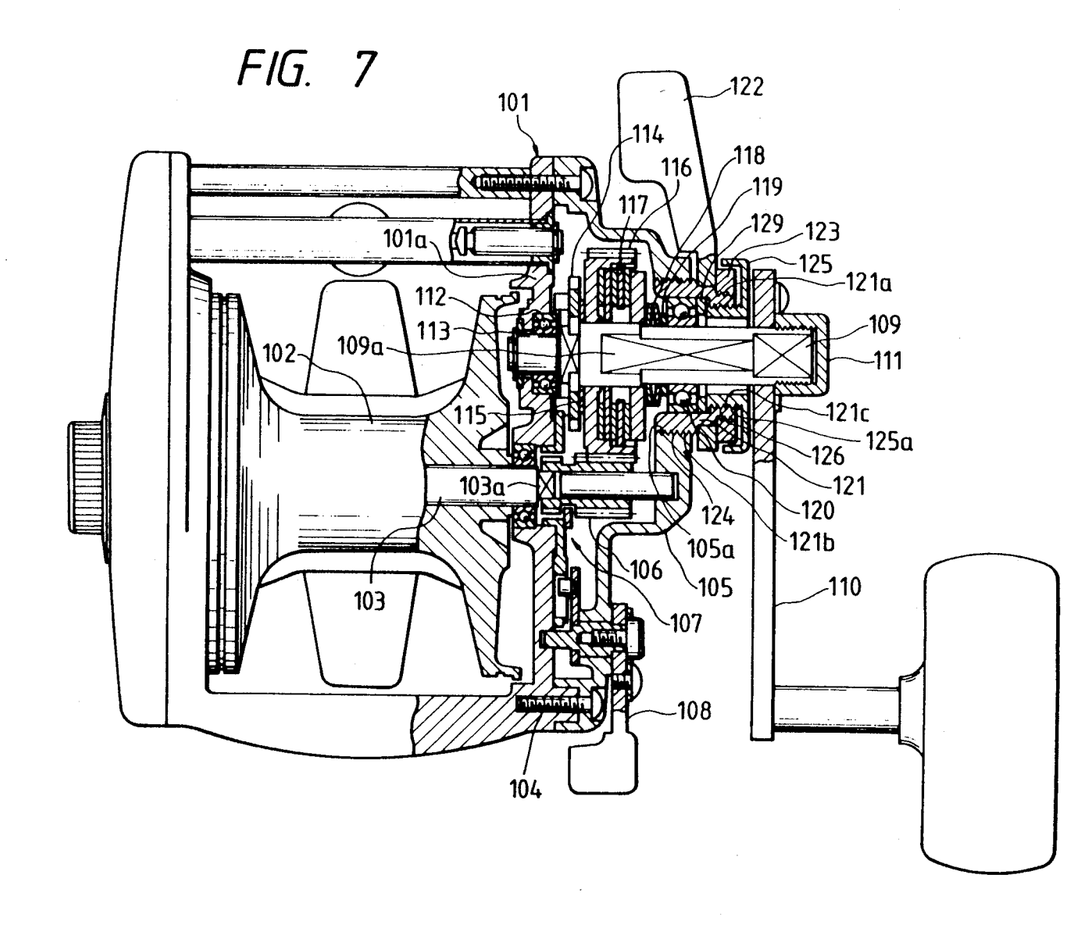
FIG. 7 is cross-sectional view of the second embodiment of the fishing reel of the present invention having radial bearings.
Figure 8:
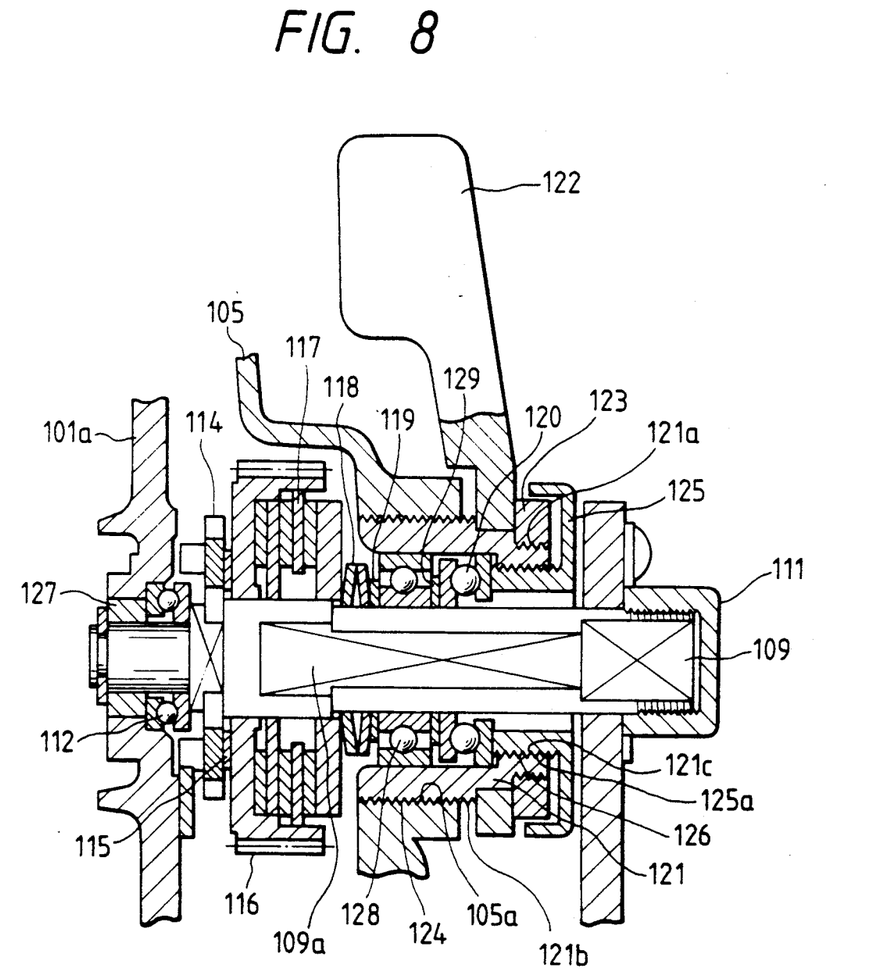
FIG. 8 is a cross-sectional view of a third embodiment of a fishing reel of the present invention having thrust bearings.

FIGS. 7 and 8 represent the second aspect of the present invention. As shown in FIGS. 7 and 8 a spool shaft 103 having first and second end portions is mounted on a reel body 101 for rotation about its axis. A spool 102 is fixedly mounted on and rotated by the spool shaft 103. The first end of the spool shaft 103 extends outwardly through a side plate 101a of the reel body 101. The reel body 101 is covered by a side cover member 105 secured to the side plate 101a by screws 104. A pinion 106 is mounted on a non-circular portion 103a located on the first end portion of the spool shaft 103 for sliding movement therealong. A clutch mechanism 107 having a clutch lever 108 is provided to operate the spool shaft 103. The clutch lever 108 of the clutch mechanism 107 functions as a switching means for sliding the pinion 106 along the spool shaft 103 in and out of engagement with the non-circular portion 103a of the spool shaft 103. When the pinion 106 engages the non-circular portion 103a, the pinion 106 rotates in conjunction with the spool shaft 103. When the pinion 106 is not engaged with the non-circular portion 103a, the pinion 106 is rotatable relative to the spool shaft 103.

A master gear shaft 109 having first and second ends and including a non-circular portion 109a is rotatably mounted with the first end being mounted in the side plate 101a of the spool body 101 by a bearing 112. The master gear shaft 109 extends parallel to the spool shaft 103. A retainer ring 113 is mounted on the master gear shaft 109 to prevent any axial movement thereof. A handle 110 is fixedly secured to the second end of the master gear shaft 109 by a clamp screw 111.

A ratchet 114 is fixedly mounted on the first end of the master gear shaft 109. The ratchet 114 includes a pawl (not shown) that is engageable with the ratchet for preventing reverse rotation of the ratchet. A master or drive gear 116 is mounted on the master gear shaft 109 and meshes with the pinion 106. A washer 115 is interposed between the ratchet 114 and the master gear 116. A plurality of drag washers 117 formed of friction plates are mounted on the non-circular portion of the master gear shaft 109 for rotation and are located adjacent the center of the master gear 116. The presence of the plurality of drag washers 117 allows the master gear 116 to rotate in conjunction with the master gear shaft 109 and to slide relative thereto. Ball bearing 120, spring washer 118 and washer 119 are mounted on the master gear shaft 109 axial movement. The drag washers 117 are urged by a ball bearing 120 that pushes on a spring washer 118 and a washer 119 located therebetween.

A generally cylindrical drag adjustment member 121 is mounted on the side cover member 105. The second end of the master gear shaft 109 extends through the drag adjustment member 121. A drag adjustment lever 122 is fixedly secured to the drag adjustment member 121 by a nut 123 threaded on a threaded portion 121a thereof. The ball bearing 120 is located within the interior of the drag adjustment member 121. The drag adjustment member 121 is supported on the side cover member 105 by a first axially moving means 124. Upon rotation of the drag adjustment lever 122 in its normal and reverse directions the drag adjustment member 121 is axially moved relative to the side cover member 105.

A drag preset member 125 is supported on one end portion of the drag adjustment member 121 adjacent to the handle 110 by a second axially moving means 126. As a result, the drag preset member 125 is movable along the axis of the master gear shaft 109 relative to the drag adjustment member 121. The master gear shaft 109 extends through the middle of the drag preset member 125. In the embodiment of FIG. 7, a washer 129 is interposed between the ball bearing 120 and the inner end of the drag preset member 125. In the embodiment of FIG. 8, the washer 129 is not used instead, the inner end of the drag preset member 125 is directly held against the ball bearing 120.

In the embodiment of FIG. 7, each of the ball bearings 112 and 120 is a radial bearing. Additionally, the bearings may be thrust bearings for bearing thrust loads, as in the embodiment of FIG. 8. In the latter case, it is preferred that the master gear shaft 109 be supported by the side plate 101a and thrust ball bearing 112. Further, it is preferred that the bearing member 127 be made, for example, of metal, and that in addition to the thrust ball bearing 120, a radial ball bearing 128 be mounted within the drag adjustment member 121 so as to bear a radial load on the master gear shaft 109.

Concerning the embodiment of FIG. 7, the master gear shaft 109 includes a first end near to the handle 110 that is supported by one radial ball bearing 120. It is preferred that a washer 129 be interposed between the ball bearing 120 and the inner end of the drag preset member 125. Alternatively, where the master gear shaft 109 is supported by the two ball bearings 120 and 128 as shown in FIG. 8, it is preferred that a washer 129 be interposed between these two ball bearings.

In the illustrated embodiments of FIGS. 7 and 8, the first axially moving means 124 comprises an internally threaded hole 105a in interior surface of the side cover member 105 and an externally threaded portion 121b on the external surface of the drag adjustment member 121. The externally threaded portion 121b engages the threaded hole 105a. The second axially moving means 126 comprises an internally threaded portion 121c of the drag adjustment member 121 and an externally threaded portion 125a of the drag preset member 125 which engage one another. Although each of the axially moving means 124 and 126 comprises a thread arrangement, the present invention is not be limited to such but may be of the cam type.

In operation, when the handle 110 is rotated in its normal direction and the pinion 106 is in engagement with the spool shaft 103, as shown in FIG. 7, the spool 102 is rotated by the interaction of the master gear 116, the pinion 106, and the spool shaft 103. Consequently, the fishing line is wound around the spool 102.

A reverse rotation preventing pawl (not shown) engageable with the ratchet 114 functions to feed the fishing line. When the spool 102 is rotated in its reverse direction, the master gear 116 is rotated in its reverse direction through the spool shaft 103 and the pinion 106. Drag braking is applied because of the friction between the master gear 116 and the drag washers 117.

The rotation of the drag adjustment lever 122 in its normal and reverse directions, rotates the drag adjustment member 121 in its respective normal and reverse directions in conjunction with the ball bearing 120 so that the drag adjustment member 121 is axially moved forwardly and rearwardly relative to the side cover member 105 along the master gear shaft 109 by the axially moving means 124. As a result, the drag adjustment member 121 urges the drag washers 117 toward the master gear 116 by pushing on the ball bearing 120, the washer 119 and the spring washer 118. Therefore, the urging force applied to the master gear 116 is lessened. In this manner, the drag force can be adjusted as desired.

Moreover, the drag preset member 125 is axially moved forwardly and rearwardly relative to the drag adjustment member 121 along the master gear shaft 109 by the axially moving means 126, upon rotation of the drag preset member 125 in its normal and reverse directions. As a result, the drag preset member 125 urges the drag washers 117 toward the master gear 116 by pushing the ball bearings 120, the washer 119 and the spring washer 118 and weakens the urging force. Thus, the drag force can be adjusted as desired.

The structures of FIGS. 7 and 8, allow changes in the drag adjustment merely by rotating the drag adjustment lever 122 and the drag preset member 125. Additionally, by manipulating the drag adjustment lever 122, the drag adjustment member 121 is rotated together with the ball bearing 120, so that the drag adjusting operation can be carried-out smoothly. This also enables the user to finely adjust the drag. Further, since the spring washer 118, the washer 119, the ball bearing 120, the drag adjusting member 121, the drag adjustment lever 122, the drag preset member 125, etc., can be assembled into position from the exterior of the reel, excellent productivity and low manufacturing costs can be achieved.

Other embodiments of the present invention will be apparent to those skilled in the art from consideration of the specification and practice of the disclosed invention. It is intended that the specification and examples be considered as exemplary only, with the true scope and spirit of the invention being represented by the following claims.

What is claimed is:

1. A fishing reel comprising:
    a body having a side wall and a cover member secured to said side wall;
    a spool shaft mounted on said body for rotation about a first axis;
    a spool fixedly mounted on said spool shaft for joint rotation to wind a fishing line around said spool;
    a master gear shaft having first and second ends;
    a master gear rotatably mounted on said master gear shaft and disposed adjacent to said side wall;
    a handle secured to said second end of said master gear shaft to rotate said master gear about said master gear shaft;
    a pinion mounted on said spool shaft and meshingly engaging said master gear wherein said first end is attached to said side wall to rotate said pinion;
    a plurality of drag washers including friction plates being mounted on said master gear shaft and urged into contact with said master gear;
    a drag spring washer mounted adjacent to a central portion of said master gear shaft;
    a first ball bearing mounted on said master gear shaft for movement therealong;
    a drag adjustment member including a generally hollow cylindrically shaped member mounted around said master gear shaft and engaged with said cover member, said drag adjustment member being rotatable with respect to said cover member to move along said master gear shaft to urge said drag washers toward said master gear by pushing said first ball bearing and said drag spring washer;
    a drag adjustment lever fixedly secured to said drag adjustment member to rotate said drag adjustment member about said master gear shaft with respect to said cover member;
    a drag preset member engaged with said drag adjustment member, said drag preset member being rotatable with respect to said drag adjustment member, said drag preset member and said drag adjustment member having means for moving said drag preset member and said drag adjustment member axially along said master gear shaft to urge said drag washers toward said master gear by pushing said first ball bearing and said drag spring washer; and wherein said first ball bearing and said drag spring washer being contained within said drag adjustment member, and said first ball bearing and said drag spring washer being disposed between said drag washers and said drag preset member.

2. A fishing reel according to claim 1, wherein;

said cover member includes an internally threaded hole, said drag adjustment member having an externally threaded portion;

said externally threaded portion of said drag adjustment member being engaged with said threaded hole whereby said drag adjustment member is rotatable with respect to said cover member to move along said master gear shaft;

said drag adjustment member further having an internally threaded portion and said drag preset member having an externally threaded portion; and said externally threaded portion of said drag preset member being engaged with said internally threaded portion of said drag adjustment member whereby said drag preset member is rotatable with respect to said drag adjustment member to move said first ball bearing and said spring washer on said master gear shaft.

3. A fishing reel according to claim 1, further comprising:

a second ball bearing mounted on said side wall of said body for supporting said master gear at said first end thereof.

4. A fishing reel according to claim 3, wherein:

said first and second ball bearings are radial bearings.

5. A fishing reel according to claim 3, further comprising:

a third ball bearing mounted on said master gear shaft for movement therealong and received within said drag adjustment member;

said third ball bearing being disposed between said drag spring washer and said first ball bearing; and said first and second ball bearings being thrust bearings while said third ball bearing is a radial bearing.

* * * * *